(12) United States Patent
Kumabe et al.

(10) Patent No.: US 6,794,016 B2
(45) Date of Patent: Sep. 21, 2004

(54) RECYCLABLE WATER-RESISTANT CORRUGATED FIBERBOARD SHEET

(75) Inventors: Masahiro Kumabe, Tokyo (JP); Fumito Ogawa, Tokyo (JP); Masaru Yamakoshi, Tokyo (JP); Tatsuhiko Nishiyauchi, Tokyo (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 10/180,137

(22) Filed: Jun. 27, 2002

(65) Prior Publication Data

US 2003/0087065 A1 May 8, 2003

Related U.S. Application Data

(63) Continuation of application No. PCT/JP00/05175, filed on Aug. 2, 2000.

(30) Foreign Application Priority Data

Dec. 27, 1999 (JP) ............................................. 11-371888

(51) Int. Cl.[7] ............................. B32B 3/28; B32B 5/16; B32B 15/02
(52) U.S. Cl. ....................... 428/182; 428/212; 428/324; 428/328; 428/330; 428/331; 428/363; 428/402
(58) Field of Search ................................ 428/182, 184, 428/207, 212, 324, 328, 330, 331, 357, 363, 402

(56) References Cited

U.S. PATENT DOCUMENTS

| 3,308,006 A | * | 3/1967 | Kresse et al. ................ 428/182 |
| 3,617,428 A | | 11/1971 | Carlson |
| 4,950,524 A | | 8/1990 | Hacker |
| 5,750,237 A | | 5/1998 | Allin et al. |

FOREIGN PATENT DOCUMENTS

| DE | 40 21 696 | 1/1992 |
| JP | 53-141793 | 12/1978 |
| JP | 59-15596 | 1/1984 |
| JP | 10-194326 | 7/1998 |
| JP | 10-226001 | 8/1998 |
| JP | 11-254565 | 9/1999 |
| WO | WO 96/38296 | 12/1996 |

* cited by examiner

*Primary Examiner*—Donald J. Loney
(74) *Attorney, Agent, or Firm*—Oblon, Spivak, McClelland, Maier & Neustadt, P.C.

(57) ABSTRACT

A water-resistant corrugated fiber board sheet having a high water resistance and capable of being recycled after the use contains a water-resistant linerboard adhered to both surfaces of a corrugated, water-resistant core sheet, The water repellency (JIS P8137) of at least one of both surfaces of the corrugated, water-resistant core sheet and the core sheet-side surface of the water-resistant linerboard in the recyclable water-resistant corrugated fiber board sheet is at least R 6 and the Cobb water absorption (JIS P8140; contact time: 30 minutes) of the surface of the corrugated fiberboard sheet is not higher than 30 gm$^2$.

12 Claims, No Drawings

RECYCLABLE WATER-RESISTANT CORRUGATED FIBERBOARD SHEET

TECHNICAL FIELD

The present invention relates to recyclable water-resistant corrugated fiberboard sheets suitable for use as materials for corrugated fiberboard containers for transporting substances while keeping the freshness thereof, particularly materials for corrugated fiberboard containers for transporting perishable foods such as fresh fishes, vegetables, fruits and meats together with ice, which sheets can be easily produced and also easily macerated or disintegrated.

BACKGROUND ART

Corrugated fiberboard containers are widely used for the transportation. However, ordinary corrugated fiberboard containers have a disadvantage in that they are not resistant to water. Therefore, water-repellency and water resistance are imparted to corrugated fiberboard sheets to be used for making containers for water-containing foods such as fruits, vegetables, fresh fishes, meats and frozen foods, as well as contents which must be transported at a low temperature for keeping them fresh and thereby causing the moisture condensation.

As such corrugated fiberboards, those prepared by applying a molten wax to the surface of them or by impregnating them with the wax are known.

However, the corrugated fiberboards having such a wax applied thereto in a large amount cannot be recycled as waste papers. When such a corrugated fiberboard containing wax is collected together with the ordinary corrugated fiberboards as waste paper by mistake, it causes problems such as that a paper is broken in a regenerated paper-making step and that black spots of the wax appear on the regenerated product to seriously reduce the commercial value of the product.

Corrugated fiberboards produced by combining a corrugated fiberboard linerboard with a synthetic resin film such as a polyolefin film are also known. Also such corrugated fiberboard linerboards cannot be recovered as waste paper to be used as the starting pulp material and, they are burnt or buried for a landfill at present.

As strong demand for recycling resources is grown recently under these circumstances, various corrugated fiberboards which have water-repellency and water-resistance and which can be recycled and used as starting materials for waste paper pulp have been proposed.

For example, a method wherein a synthetic resin emulsion and a wax emulsion are applied to the surface of a linerboard to impart both water resisting function and water-repelling function to the corrugated fiberboards was proposed [see Japanese Patent Unexamined Published Application (hereinafter referred to as "J. P. KOKAI") No. Sho 59-15596].

The corrugated fiberboards having the water-repellent layer prepared from such synthetic resin emulsion and wax emulsion have the water-repellent function and, in addition, they can be macerated and, therefore, they can be recycled.

Further, J. P. KOKAI No. Hei 10-226001 discloses a recyclable water-resistant corrugated fiberboard sheet prepared by imparting the water repellency to the surface of a corrugated fiberboard sheet linerboard to be adhered to a corrugated, water-resistant core sheet and also to the surface of the core sheet, so as to especially prevent the corrugated fiberboard sheet from wetting with water through the flute surface of the fiberboard and also to improve the water resistance of the corrugated fiberboard sheet.

However, when even such a corrugated fiberboard sheet is used as a material for boxes to be brought into contact with a large amount of water for a long period of time, such as boxes for frozen fishes or boxes in which perishable foods are to be packaged together with ice, water penetrates through the linerboard surface of the corrugated fiberboard sheet to reduce the strength of the sheet and thereby to cause the crushing of the boxes.

Therefore, the object of the present invention is to provide a water-resistant corrugated fiberboard sheet having a high water resistance and capable of being recycled after the use.

DISCLOSURE OF THE INVENTION

After intensive investigations made for the purpose of attaining the above-described objective, the inventors have found that the objective can be attained by constructing the corrugated fiberboard sheet as follows. The present invention has been completed on the basis of this finding.

Namely, the present invention relates to a recyclable, water-resistant corrugated fiberboard sheet comprising a water-resistant linerboard adhered to both surfaces of a corrugated, water-resistant core sheet (or corrugating medium), wherein the water repellency (JIS P8137) of at least one surface selected from the group consisting of both surfaces of the corrugated, water-resistant core sheet and the core sheet-side surface of the water-resistant linerboard is at least R 6 and that the Cobb water-absorption (JIS P8140; contact time: 30 minutes) of the surface of the corrugated fiberboard sheet (the surface of the water-resistant linerboard on the side not adhered to the corrugated, water-resistant core sheet) (i.e. at least one of both sides of the corrugated fiberboard sheet) is not higher than 30 g/m$^2$.

In a preferred embodiment of the present invention, a water-resistant layer is formed on at least one of the surfaces of the corrugated fiberboard sheet by applying a water-resistant coating containing a synthetic resin emulsion or this emulsion and a pigment.

In another preferred embodiment of the present invention, the water-resistant coating contains 30 to 60% by mass, based on the solid content, of the pigment.

In still another preferred embodiment of the present invention, the pigment in the water-resistant coating comprises 5 to 40% by mass of a pigment having an average particle diameter of 5 to 15 $\mu$m and 95 to 60% by mass of a pigment having an average particle diameter of not larger than 3 $\mu$m.

In a further preferred embodiment of the present invention, the water-resistant coating contains a synthetic resin emulsion having a gel content of at least 90%.

In a further preferred embodiment of the present invention, the water repellency of each of the single facer side of the water-resistant core sheet and the surface of the water-resistant linerboard on the side adhered to the water-resistant corrugated core sheet is not higher than R 2, and the water repellency of each of the double facer side of the water-resistant core sheet and the surface of the corrugated fiberboard sheet is at least R 6.

In a further preferred embodiment of the present invention, at least one surface of the water-resistant core sheet carries 0.01 to 2.0 g/m$^2$ of a water repellent.

In a further preferred embodiment of the present invention, the water repellent comprises a wax having a melting point of not higher than 70° C.

In a further preferred embodiment of the present invention, the adhesive for bonding each of both surfaces of the corrugated water-resistant core sheet with the water-resistant linerboard is a water-resistant adhesive comprising a starch, an agent for making the starch water-resistant and a synthetic resin emulsion.

MODE FOR CARRYING OUT THE INVENTION

The water-resistant core sheet and the water-resistant linerboard used for producing the recyclable water-resistant corrugated fiberboard sheet of the present invention are those having a ring crush strength (residual strength after water immersion) after immersing them in water at 20° C. for 24 hours of at least 10%, when the ring crush strength of them in dry state is set 100% as determined according to JIS P8126.

The water-resistant core sheet and the water-resistant linerboard are prepared from a pulp which is usually used for preparing ordinary core sheets and linerboards. They are prepared by incorporating a water-resisting agent in the paper-making step or by impregnating the paper with the water-resisting agent or applying this water-resisting agent to the paper prior to the drying and then drying them in a paper-making machine. Concretely, HP 200 and MMS 200 (products of Hokuyo Seishi K.K.), etc. are available as the water-resisting core sheet on the market. As the water-resistant linerboard, for example, non-water repellent SRK 280 (a product of Oji Paper Co., Ltd.) is available on the market.

The corrugated water-resistant core sheet can be formed by corrugating a water-resisting core sheet by a well-known method with various apparatuses.

For forming the recyclable, water-resistant corrugated fiberboard sheet of the present invention, a water-resistant core sheet or water-resistant linerboard to which a synthetic resin film such as PET film is applied should not be used. When such a water-resistant core sheet or water-resistant linerboard is used, the maceration of the fibers in the corrugated fiberboard sheet is impaired by the synthetic resin film to make the recycling impossible.

The water-resistant linerboard can be applied to both surfaces of the corrugated water-resistant core sheet by a known method with various kinds of machines. Concretely, the recyclable, water-resistant corrugated fiberboard sheet of the present invention is formed by suitably adhering the corrugated water-resistant core sheet and the water-resistant linerboard to each other with a corrugated fiberboard sheet-producing apparatus called "corrugator". The corrugator mainly comprises a single facer (hereinafter referred to as "SF") part for adhering the water-resistant core sheet and the water-resistant linerboard to each other and a double facer (hereinafter referred to as "DF") for further adhering the core sheet side surface of the single-corrugated board sheet obtained in SF part and the linerboard base paper to each other.

In the adhering in the corrugator, the corrugated fiberboard sheet is treated, for example, at a temperature of 150 to 200° C. under a line pressure of 20 to 40 kg/cm for a pressing time of 0.01 to 0.20 second in a press roll part in the SF part, and, for example, at a temperature of 150 to 200° C. under a line pressure of 0.3 kg/cm for a pressing time of 2 to 5 seconds in a platen part in the DF part.

In the present invention, the water repellency (JIS P8137) of at least one of the four surfaces, namely, both surfaces of the corrugated, water-resistant core sheet and the core sheet-side surface of each of the two water-resistant linerboards, is at least R 6. The water repellency represented by R and the numeral is defined in JIS.

A water repellency of at least R 6 can be imparted to the surface of the water-resistant core sheet or the surface of the water-resistant linerboard by, for example, treating the surface thereof with a water repellent.

Various repellents are usable. Among those repellents, waxes are particularly preferred. The suitable waxes are, for example, those having a melting point of not higher than 70° C. The waxes include, for example, paraffin wax, polyethylene wax, carnauba wax and lanolin. In those waxes, the paraffin wax is preferred.

The water repellent to be applied to the surface of the water-resistant core sheet or water-resistant linerboard is used in an amount of 0.01 to 2.0 $g/m^2$, preferably 0.1 to 1.0 $g/m^2$ and more preferably 0.3 to 0.5 $g/m^2$.

The water-repellent surface is preferably the surface on DF side of the water-resistant core sheet or the water-resistant linerboard surface on DF side. In such a case, the water repellency of the SF side of the water-resistant core sheet and water-resistant linerboard may be below R 6.

In the present invention, the Cobb water-absorption (JIS P8140; contact time: 30 minutes) of the surface of the corrugated fiberboard sheet (the surface of the water-resistant linerboard on the side not adhered to the corrugated, water-resistant core sheet) (i.e. at least one of both sides of the corrugated fiberboard sheet) is not higher than 30 $g/m^2$, preferably not higher than 10 $g/m^2$. The Cobb water-absorption is a characteristic property for evaluating the degree of the water permeability. The lower the Cobb water-absorption, the lower the water permeability.

Such a Cobb water-absorption can be easily realized by applying a water-resisting coating to the surface of the water-resistant linerboard.

The water-resistant coatings are, for example, synthetic resin emulsions or a combination of such a synthetic resin emulsion with a pigment. The synthetic resin emulsions used for forming the water-resistant coatings are emulsions of synthetic resins, preferably styrene/butadiene copolymer, styrene/acrylic copolymer and ethylene/vinyl acetate copolymer. When a water-resistant layer having both water-resistance and heat resistance is to be formed, a mixture of the styrene/butadiene copolymer having a high water resistance and the styrene/acrylic copolymer having a high heat resistance is desirable.

The synthetic resin is used in an amount of, for example, 30 to 90% by mass, preferably 40 to 70% by mass, based on the water-resistant coating.

For forming the water-resistant layer having a high heat resistance, the gel content of the synthetic resin emulsion is desirably, at least 90%, more desirably at least 94%. The upper limit of the gel content may be, for example, 98%.

It is also desirable to incorporate the styrene/acrylic copolymer in a relatively large amount for the purpose of improving the surface properties such as abrasion resistance.

The amount (in terms of the solid content) of the styrene/acrylic copolymer is, for example, 10 to 30% by mass, preferably 15 to 25% by mass, based on the styrene/butadiene copolymer.

Various pigments are usable for preparing the water-resistant coatings. The pigments include inorganic and organic pigments. The inorganic pigments are, for example, precipitated calcium carbonate, calcium carbonate, heavy calcium carbonate, silica and clay. A particularly preferred pigment is, for example, heavy calcium carbonate.

The organic pigments are, for example, fine powders of acrylic resin, benzoguanamine resin, urea resin and starch particles. In the organic pigments, those in the form of nearly spherical particles are more suitable than the inorganic pigments because the former is capable of reducing the contact area between the surface coated with the water-resistant coating and the press roll or hot DF plate.

When the water-resistant coating is applied to the surface of the water-resistant linerboard, care should be taken of the following points: When the laminating temperature is above the melting point of the synthetic resin, the water-resistant layer is molten by heat and, as a result, troubles might be caused by the fusion in the press roll part in SF and the platen part in DF. By incorporating the pigment into the water-resistant layer in the present invention, the pigment particles are exposed on the surface of the water-resistant layer to reduce the contact area between the water-resistant layer and the press roll or the platen in DF. As a result, troubles caused by the fusion-bonding of the coated surface to the press roll or platen can be prevented and the operation with the corrugator is facilitated.

Therefore, the pigment in the water-resistant coating used for the above-described purpose preferably has an average particle diameter of, for example, 5 to 15 $\mu$m.

The pigment particles are preferably other than those having a platy or flaky form. They are desirably in such a shape that the aspect ratio of them is less than 5, preferably nearly 1. Concretely, the particles are in a spherical form. When the pigment is in the platy or flaky form, it is inclined to deposit in the form of a layer in the coating layer and whereby the effect of reducing the contact area between the water-resistant layer and the press roll or the platen in DF becomes insufficient. When the average particle diameter of the pigment is smaller than 5 $\mu$m, the contact area between the coated surface and the press roll or the platen is large to reduce the effect of improving the heat resistance. On the other hand, when the average particle diameter is larger than 15 $\mu$m, the water resistance of the water-resistant layer is inclined to be lowered. The amount of the pigment having such an average particle diameter is, for example, at least 5% by mass based on the whole pigment, in the water-resistant coating used in the present invention, taking the effect of the pigment into consideration. Usually, the amount of such a pigment is, for example, 5 to 40% by mass, preferably 10 to 30% by mass, based on the whole pigments.

On the other hand, the platy or flaky pigments are also usable in the present invention. They are preferably those having an aspect ratio of at least 5, particularly at least 20. By forming a layer of such a pigment in the coated layer, the water resistance can be further improved. Preferred examples of such pigments include kaolin, talc, mica, sericite and aluminum hydroxide. Among those pigments, kaolin of the delamination type is preferred.

Such a platy or flaky pigment may have an average particle diameter of 3 $\mu$m or less. When the pigment having an average particle diameter of 3 $\mu$m or less is used, the pigment forms two or more layers in the coating layer to further improve the water resistance.

The platy or flaky pigment is usable in combination with the above-described pigments which are not platy or flaky. By the combination, the problem of the fusion-bonding is solved to some extent and the water resistance can be further improved.

Such a pigment can be used in an amount of, for example, at least 30% by mass, preferably at least 60% by mass, based on the whole pigments. The amount is, for example, 60 to 95% by mass.

Preferably, the pigment itself is heat resistant.

A water-soluble resin, an agent for imparting water-resistance or the like can be suitably incorporated into the water-resistant coating for the purpose of controlling the viscosity of the coating or improving the coating properties.

The water-soluble resins used herein include, for example, starch, modified starch, PVA, modified PVA, casein, carboxymethylcellulose, acrylic resin, acrylamide and polyesters.

The agent for imparting water-resistance used herein includes, for example, urea/formaldehyde resin, melamine/formaldehyde resin, polyamide-formaldehyde resin, glyoxal, ketone aldehyde resin, polyglycidyl ether and dialdehyde starch.

The water-resistant coating may suitably contain additives such as dispersants, antifoaming agents, lubrication regulators and dyes, if necessary.

The water-resistant coating desirably comprises a synthetic resin emulsion containing 30 to 60% by mass (in terms of the solid content) of the pigment.

The synthetic resin emulsions particularly suitable in the present invention are styrene/butadiene copolymer emulsion and/or styrene/acrylic copolymer emulsion.

For obtaining the water-resistant layer having both water resistance and heat resistance, it is desirable to use a mixture of styrene/butadiene copolymer excellent in water resistance and styrene/acrylic copolymer excellent in heat resistance.

For obtaining improved surface properties such as friction resistance, it is desirable to use the styrene/acrylic copolymer in a relatively large amount.

The coating of the present invention may contain a water-soluble resin for controlling the viscosity of the coating and also for improving the coating properties, and also an agent for imparting the water-resistance, if necessary.

The water-soluble resins used herein include, for example, starch, modified starch, PVA, modified PVA, casein, carboxymethylcellulose, acrylic resin, acrylamide and polyesters.

The agents used herein for imparting water resistance include, for example, urea/formaldehyde resin, melamine/formaldehyde resin, polyamide-formaldehyde resin, glyoxal, ketone aldehyde resin, polyglycidyl ether and dialdehyde starch.

Further, additives such as dispersants, antifoaming agents, lubrication regulators and dyes can be suitably added, if necessary.

For further improving the lamination velocity of the water-resistant core sheet and the water-resistant linerboard of the corrugated fiberboard sheet and also for improving the adhesion strength so as to improve the productivity of this sheet, it is also desirable that no water repellency is imparted to the SF side of the water-resistant core sheet and surface, on the side to be adhered to the water-resistant core sheet, of the water-resistant linerboard (namely, R 2 or below) and the water repellency (R 6 or higher) is imparted to only DF side of the water-resistant core sheet in the corrugated fiberboard sheet in the present invention. By employing such an arrangement of the water-repellency, no problem is caused in the adhesion with an aqueous adhesive in the step of adhering the SF side because the surface of the water-resistant core sheet and the SF-side surface of the water-resistant linerboard have a water absorption similar to that of ordinary base paper. On the other hand, on DF side, unlike the SF side, the adhesion-bonding with an ordinary adhesive at an ordinary velocity is surely possible even when the surfaces to be bonded are water-repellent, because the adhesion time is as long as 2 to 3 seconds (the adhesion time on SF side is 1/10,000 to 1/50 second) due to the mechanism of the corrugator even when the adhesion velocity with the corrugator is an ordinary velocity (150 to 250 m/min).

As for the reasons why the water repellency is imparted to only one surface of the water-resistant core sheet, the inventors have confirmed the following fact by the following experiments: corrugated fiberboard sheets were produced by using three kinds of water-resistant core sheets [i.e. a water-resistant core sheet the both surfaces of which are not water-repellent (R 0), a water-resistant core sheet one surface of which is water-repellent (R 8) and a water-resistant core sheet both surfaces of which are water-repellent (R 8)]. Each of the obtained sheets was brought into contact with water in such a state that the flute surface of the sheet is contacted with water for 24 hours to penetrate water into the water-resistant core sheet. The height of the penetration of water was determined to obtain the following results: The height was 30 to 40 mm in the water-resistant core sheet the both surfaces of which are not water-repellent; 2 to 7 mm in the water-resistant core sheet one surface of which is water-repellent; and 1 to 6 mm in the water-resistant core sheet both surfaces of which are water-repellent. The inventors have thus confirmed the fact that the penetration of water can be inhibited even when only one surface of the core sheet is made water-repellent.

The adhesives for corrugated fiberboard sheets used in the present invention for adhesion-bonding the corrugated water-resistant core sheet and the water-resistant linerboard to each other are suitably selected from ordinary starch adhesives and synthetic resin emulsion adhesives. However, for obtaining the corrugated fiberboard sheets excellent in water resistance, it is preferred to use a water-resistant adhesive.

In the present invention, the term "water-resistant adhesives" indicates those having such a strength that when a dry corrugated fiberboard sheet having a pin strength (one surface pin) of 30 kgf, obtained by adhesion-bonding the water-resistant core sheet and the water-resistant linerboard to each other with the adhesive, is immersed in water for one hour, the pin strength is at least 9.8 N (1 kgf). Such a water-resistant adhesive is, for example, one comprising a starch, an agent for making the starch water-resistant and a synthetic resin emulsion. The synthetic resin emulsion is selected from those described above with reference to the water-resistant coatings.

EXAMPLES

The following Examples and Comparative Examples will further illustrate the present invention, which by no means limit the present invention.

Example 1

10 g/m² (in terms of solid content) of a water-resistant coating, comprising a synthetic resin emulsion obtained by mixing 84% by mass of a styrene/butadiene copolymer [Tg=21° C., gel content: 94% (a product of Nippon Zeon Co., Ltd.)] with 16% by mass of a styrene/acrylic copolymer [Tg=30° C.; Joncryl 734 (a product of Johnson Polymer)], was applied to one surface of a water-resistant linerboard (non-water repellent SRK 280; a product of Oji Paper Co., Ltd.) (water repellency on both surfaces: R 0) to obtain a water-resistant coating having a water-resistant layer (as for the Cobb water-absorption, refer to Table 1 given below).

On the other hand, 0.6 g/m² (in terms of solid content) of a water repellent (HA-541 containing paraffin wax as the main component; a product of Arakawa Chemical Industry K.K.) was applied to one surface of a water-resistant core sheet (HP 200 having a water repellency of R 2 at both surfaces; a product of Hokuyo Seishi K.K.) to obtain the water-resistant core sheet one surface of which has a water repellency of R 7.

The water-resistant core sheet was corrugated with a corrugating roll. The obtained corrugated water-resistant core sheet was laminated with the above-described water-resistant linerboard with an adhesive prepared by mixing a water-resistant adhesive (Honen HR-160 type; containing starch as the main component), for the preparation of corrugated fiberboards, with a styrene/butadiene copolymer emulsion (Tg=−5° C.) with a corrugator in such amounts that the solid ratio of the starch to the synthetic resin was 2/1. The lamination was conducted so that the water-resistant layer of the water-resistant linerboard would become the corrugated fiberboard sheet surface and the water-repellent surface of the water-resistant core sheet would be on the DF side. Thus, a water-resistant corrugated fiberboard sheet having B flute was obtained.

Example 2

A water-resistant corrugated fiberboard sheet layer (as for the Cobb water-absorption, refer to Table 1 given below) was obtained in the same manner as that in Example 1 except that a water-resistant coating having the following composition was applied to the water-resistant linerboard surface:

[Coating Composition]

| | |
|---|---|
| Styrene/butadiene copolymer (Tg = 21° C., gel content: 94%; Nippon Zeon Co., Ltd.) | 46% by mass |
| Styrene/acrylic copolymer (Tg = 30° C., Joncryl 734; Johnson Polymer) | 9% by mass |
| Heavy calcium carbonate (shape: spherical) (average particle diameter: 8 μm, BF 300, Bihoku Fun-Kakou Kogyo K.K.) | 45% by mass |

Example 3

A water-resistant corrugated fiberboard sheet was obtained in the same manner as that in Example 1 except that a water-resistant coating having the following composition was applied to the water-resistant linerboard surface:

[Coating Composition]

| | |
|---|---|
| Styrene/butadiene copolymer (Tg = 21° C., gel content: 94%; Nippon Zeon Co., Ltd.) | 46% by mass |
| Styrene/acrylic copolymer (Tg = 30° C., Joncryl 734; Johnson Polymer) | 9% by mass |
| Delamination type kaolin (average particle diameter 3 μm; Capim NP, RCC Co.) | 37% by mass |
| Heavy calcium carbonate (shape: granular) (average particle diameter: 8 μm, BF 300, Bihoku Fun-Kakou Kogyo K.K.) | 8% by mass |

Example 4

A water-resistant corrugated fiberboard sheet (as for the Cobb water-absorption, refer to Table 1 given below) was obtained in the same manner as that in Example 3 except that 0.6 g/m² of the water-repellent was applied to both surfaces of the water-resistant core sheet to make the water repellency of both surfaces R 7.

Example 5

A water-resistant corrugated fiberboard sheet (as for the Cobb water-absorption, refer to Table 1 given below) was obtained in the same manner as that in Example 3 except that the water-resistant coating having the following composition was used:

[Coating Composition]

| | |
|---|---|
| Styrene/butadiene copolymer (Tg = 21° C., gel content: 94%; Nippon Zeon Co., Ltd.) | 25% by mass |
| Styrene/acrylic copolymer (Tg = 30° C., Joncryl 734; Johnson Polymer) | 5% by mass |
| Delamination type kaolin (average particle diameter: 3 μm; Capim NP, RCC Co.) | 57% by mass |
| Heavy calcium carbonate (shape: granular) (average particle diameter: 8 μm, BF 300, Bihoku Fun-Kakou Kogyo K.K.) | 13% by mass |

Comparative Example 1

A water-resistant corrugated fiberboard sheet layer (as for the Cobb water-absorption, refer to Table 1 given below) was obtained in the same manner as that in Example 3 except that the water repellent was not applied to the surface of the water-resistant core sheet (the water repellency on the both surfaces of the water-resistant core sheet were R 2).

Comparative Example 2

A water-resistant linerboard (HK linerboard; a product of Hokuyo Seishi) having a water repellency on the surface of R 10 and that on the back surface of R 0 was laminated with the water-resistant core sheet, having a water repellency on one surface of R 7, obtained in the same manner as that in Example 1 with the same adhesive as that of Example 1 by means of a corrugator in such a manner that the water-repellent layer of the water-resistant linerboard would become the corrugated fiberboard sheet surface and the water-repellent surface of the water-resistant core sheet would be on the DF side. Thus, a water-resistant corrugated fiberboard sheet having B flute was obtained (as for the Cobb water-absorption, refer to Table 1 given below).

Comparative Example 3

A corrugated fiberboard sheet (as for the Cobb water-absorption, refer to Table 1 given below) was obtained in the same manner as that in Example 1 except that a product obtained by laminating one surface of the water-resistant linerboard with a PET film (30 μm) to form a water-resistant layer was used as the water-resistant linerboard.

[Water Resistance Test of Linerboard]

In the water absorption test method of papers and linerboard boards (contact time: 30 minutes), the results were classified into the following groups:

Water Absorption Through the Surface of Water-Resistant Linerboard:

| | |
|---|---|
| 10 g/m² or below | ⊚ |
| above 10 g/m² and not higher than 30 g/m² | ○ |
| above 30 g/m² and not higher than 60 g/m² | Δ |
| above 60 g/m² | X |

[Water Resistance Test of Corrugated Fiberboard]

Boxes were produced from the water-resistant corrugated fiberboards obtained in Examples and Comparative Examples with a box-making machine to obtain an A-type water-resistant corrugated fiberboard containers (type: regular slotted container; size: 23 cm×16 cm×7.5 cm).

1 kg of an ice in a plastic bag was placed in each box. After leaving the box to stand at 30° C. and 90% RH for 5 hours, the compressive strength of the box was determined.

The results were classified in the following groups:

Strength Remaining After Packaging of Ice:

| | |
|---|---|
| 70% or above | ⊚ |
| 50% to less than 70% | ○ |
| 30% to less than 50% | Δ |
| less than 30% | X |

[Macerating or Disintegrating Property]

Water was added to 60 g of a sample, obtained by cutting each of the water-resistant corrugated fiberboards obtained in Examples and Comparative Examples into pieces of a size of 2 cm×2 cm, to obtain a concentration of 4%. The obtained mixture was stirred in a disintegrator for 20 minutes. When non-disintegrated pieces of 0.5 cm² or larger were not found, the results were represented as ○, and when they were found, the results were represented as X.

[Heat Resistance in Lamination Step]

1. Press Roll Part:

The rolled linerboard obtained in each of Examples and Comparative Examples was laminated on an ordinary core sheet base paper at an SF side under conditions comprising a press roll temperature of 180° C., linear pressure of 40 kg/cm and pressing time of 0.02 second.

2. Platen Part:

The linerboard obtained in each of Examples and Comparative Examples was laminated with a corrugated fiberboard sheet of a size of A 4 in such a manner that the coated surface would be on the outside. They were heated under pressure in the platen part at a DF side of the corrugator in such a manner that the coated surface would be on the platen side under conditions comprising a temperature of 180° C., linear pressure of 0.3 kg/cm and pressing time of 5 seconds.

When the linerboard surface was not molten in the press roll part and platen part, the results were shown as ○, and when it was molten, the results were shown as X.

TABLE 1

| | Water resistante of linerboard | Cobb water-absorption on linerboard surface (g/m²) (after 30 min.) | Water resistance of corrugated fiberboard sheet | Macerating property | Heat resistance in lamination step |
|---|---|---|---|---|---|
| Ex. 1 | ⊚ | 1 | ⊚ | ○ | X |
| Ex. 2 | ⊚ | 3 | ⊚ | ○ | ○ |
| Ex. 3 | ⊚ | 2 | ⊚ | ○ | ○ |
| Ex. 4 | ⊚ | 2 | ⊚ | ○ | ○ |
| Ex. 5 | ○ | 25 | ○ | ○ | ○ |
| Comp. Ex. 1 | ⊚ | 2 | X | ○ | ○ |
| Comp. Ex. 2 | X | 67 | X | ○ | ○ |
| Comp. Ex. 3 | ⊚ | 1 | ⊚ | X | ○ |

According to the present invention, the water-resistant corrugated fiberboard sheets having a high water resistance can be provided. Also, the water-resistant corrugated fiberboard sheets recyclable after use can be provided.

What is claimed is:

1. A recyclable, water-resistant corrugated fiberboard sheet comprising a water-resistant linerboard adhered to both surfaces of a corrugated, water-resistant core sheet, wherein the water repellency (JIS P8137) of at least one of the surfaces of both of the corrugated water-resistant core sheet and the core sheet-side surface of the water-resistant linerboard is at least R 6 and that the Cobb water absorption (JIS P8140; contact time: 30 minutes) of at least one of the surfaces of the corrugated fiberboard sheet is not higher than 30 g/m², wherein a water-resistant lever is present on at least one of the surfaces of the corrugated fiberboard sheet, said water resistant layer comprises a synthetic resin and a pigment mixture, wherein the pigment mixture comprises 5 to 40% by mass of a first pigment having an aspect ratio of less than 5 and an average particle diameter of 5 to 15 μm and 95 to 60% by mass of a second pigment having an average particle diameter of not larger than 3 μm.

2. The water-resistant corrugated fiberboard sheet according to claim 1, wherein said water-resistant layer comprises 30 to 60% by mass, based on the solid content, of the pigment mixture.

3. The water-resistant corrugated fiberboard sheet according to claim 1, wherein said water-resistant layer comprises a synthetic resin, said synthetic resin having a gel content of at least 90%.

4. The water-resistant corrugated fiberboard sheet according to claim 1, wherein the water repellency of each of a single facer side of the corrugated water-resistant core sheet and the surface of the water-resistant linerboard on the side adhered to the water-resistant corrugated core sheet is not higher than R 2, and the water repellency of a double facer side of the corrugated water-resistant core sheet is at least R 6.

5. The water-resistant corrugated fiberboard sheet according to claim 1, wherein at least one surface of said water-resistant core sheet has 0.01 to 2.0 g/m² of a water repellant.

6. The water resistant corrugated fiberboard sheet according to claim 5, wherein said water repellant comprises a wax having a melting point of not higher than 70° C.

7. The water-resistant corrugated fiberboard sheet according to claim 1, wherein the adhesive for bonding each of both surfaces of the corrugated water-resistant core sheet with the water-resistant linerboard is a water-resistant adhesive comprising a starch, an agent for making the starch water-resistant and a synthetic resin emulsion.

8. The water-resistant corrugated fiberboard sheet according to claim 1, wherein the first pigment has an aspect ratio of from 1 to 5 and the second pigment has an aspect ratio of at least 20.

9. The water-resistant corrugated fiberboard sheet according to claim 1, wherein the first pigment is spherical and the second pigment is of platy or flaky form.

10. The water-resistant corrugated fiberboard sheet according to claim 1, wherein the first pigment end the second pigment are inorganic pigments.

11. The water-resistant corrugated fiberboard sheet according to claim 1 wherein the first pigment is at least one selected from the group consisting of precipitated calcium carbonate, calcium carbonate, heavy calcium carbonate, silica, and clay and the second pigment is at least one selected from the group consisting of kaolin, talc, mica, sericite and aluminum hydroxide.

12. The water-resistant corrugated fiberboard sheet according to claim 1, wherein the synthetic resin comprises at least one selected from the group consisting of a styrene/butadiene copolymer and a styrene/acrylic copolymer.

* * * * *